June 26, 1962   B. C. STUPP   3,040,560
APPARATUS FOR MAKING FRICTION TESTS
Filed Nov. 13, 1958   2 Sheets-Sheet 1

INVENTOR.
BERNARD C. STUPP
BY
HIS ATTORNEYS

June 26, 1962
B. C. STUPP
3,040,560
APPARATUS FOR MAKING FRICTION TESTS
Filed Nov. 13, 1958
2 Sheets-Sheet 2
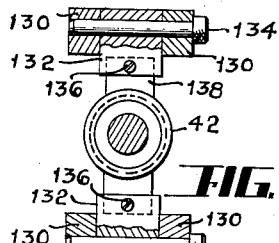
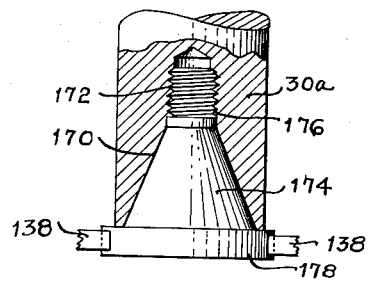
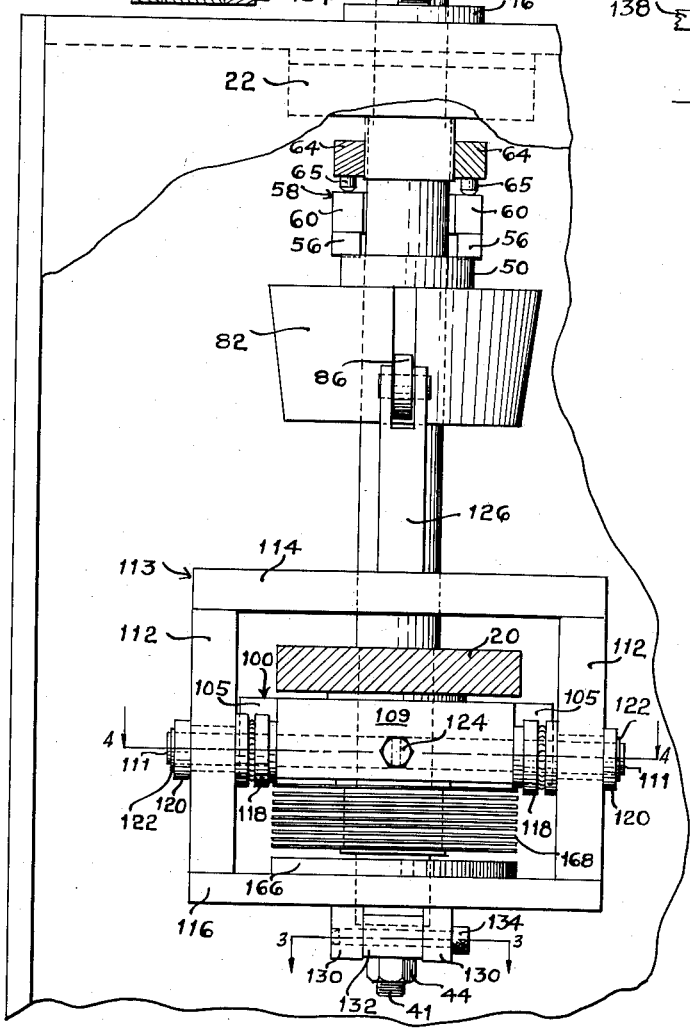
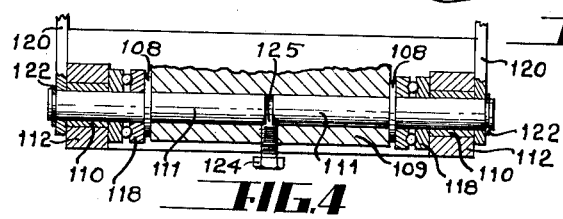
INVENTOR.
BERNARD C. STUPP
BY
*Dybvig & Jacox*
HIS ATTORNEYS United States Patent Office 3,040,560
Patented June 26, 1962

3,040,560
APPARATUS FOR MAKING FRICTION TESTS
Bernard C. Stupp, 814 Vermont Ave., Dayton 4, Ohio
Filed Nov. 13, 1958, Ser. No. 773,666
5 Claims. (Cl. 73—9)

This invention relates to an apparatus for making friction tests and more particularly to an apparatus for continuously measuring the coefficient of sliding friction of a test surface, however, the invention is not necessarily so limited.

Numerous treatments have been devised for improving the friction and wear characteristics of treated metallic surfaces. A basic test used in determining the merit of a given surface treatment is a test wherein the surface is subjected continuously to sliding friction until wear has substantially obliterated the effects of the treatment. During such tests, the coefficient of sliding friction is measured continuously and this coefficient is one indicator of the merit of the treatment. The time required for obliteration of the effects of the treatment through frictional wear is another indicator.

The test results obtained with any given surface treatment are found to vary widely depending upon the ambient temperature, the relative humidity, the presence of chemical agents in the atmosphere, and so on. It is therefore desirable that apparatus used for testing the wear characteristics of specially treated metallic surfaces be capable of measuring the coefficient of sliding friction at all times during a test run, of measuring the life of the treated surface, and of providing a controlled atmosphere for testing. My copending application Serial No. 650,661, filed April 4, 1957 for an Apparatus for Making Friction Tests discloses apparatus which meets the first two prerequisites. The present application relates to improvements in that apparatus.

An object of the present invention is to provide improved apparatus for making friction tests.

Another object of the present invention is to provide an apparatus for testing the frictional characteristics of a rotating cylindrical surface including means for pressing rub shoes against the surface with equal force from opposite directions.

Another object of this invention is to provide an apparatus for pressing rub shoes against a rotating cylindrical metallic surface so as to produce sliding friction, the construction and arrangement being such that the supporting assembly for the rub shoes is free to rotate independently of the test surface about its axis of rotation enabling accurate measurement of the coefficient of sliding friction.

Another object of this invention is to provide an apparatus for making friction tests which is so designed that the test may be conducted in a controlled environment.

Other objects and advantages reside in the construction of parts, the combination thereof, the method of manufacture and the mode of operation, as will become more apparent from the following description.

In the drawings, FIGURE 1 is a front elevation view of the apparatus for making friction tests with parts broken away, other parts shown in section, and still other parts shown in phantom.

FIGURE 2 is a fragmentary side elevation view of the apparatus with some parts broken away and others shown in section.

FIGURE 3 is an enlarged section view taken substantially along the line 3—3 of FIGURE 2.

FIGURE 4 is a section view taken substantially along the line 4—4 of FIGURE 2.

FIGURE 5 is an enlarged section view of a modified holder for testing elements.

Figure 1:
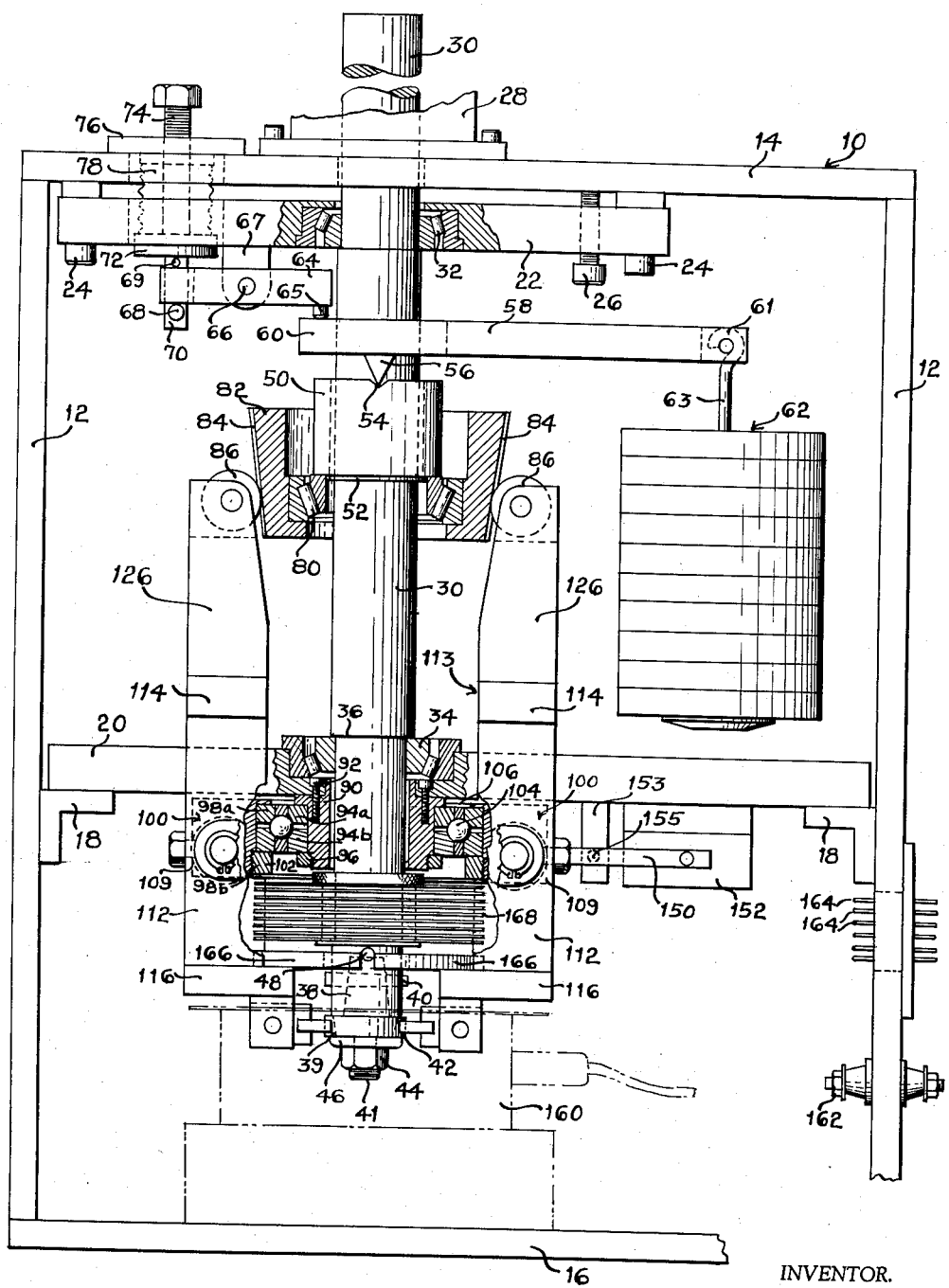

Referring to the drawings in greater detail, the test apparatus as illustrated in FIGURE 1 is housed within a cabinet 10 formed by side walls 12, a top 14, and a base 16. Angle brackets 18 secured to opposite side walls 12 support a platform or shelf 20 which functions as a bearing plate. Another bearing plate 22 is secured to the top of the cabinet with bolts 24.

A shaft 30 extends vertically through the bearing plates 20 and 22, then passes through the top of the cabinet, and through a seal assembly 28 shown in fragmentary detail. This seal assembly is packed with vacuum grease to make an air tight seal with the shaft 30 at the top of the cabinet. Motive means, not shown, are mounted on top of the cabinet for rotating the shaft 30.

End thrust bearings 32 and 34 located in the bearing plates 22 and 20, respectively, fix the rotational axis for the shaft 30. Bolts 26 threadedly engaging the plate 22 and bearing against the top of the cabinet are used to adjust the bearing 32 to precise axial alignment with the bearing 34 and to preload the bearings. By manipulating the bolts 26 and the bolts 24, fine adjustment of the plate 22 may be accomplished.

The weight of the shaft 30 is supported by the bearing plate 20 through the bearing 34. To this end the shaft 30 has an annular shoulder 36 engaging the inner race of the bearing 34.

The lower end of the shaft 30 is provided with an axially tapered cavity for receiving an adaptor plug 38 secured by a transverse tapered pin 40. The plug 38 has a bevelled portion 39 adjacent the end of the shaft 30 and terminates in a threaded portion 41. The arrangement is such that an annular race 42 which is to be subjected to test may be fitted on the bevelled portion of the plug 38 and secured thereto by a nut 44. A washer 46 is inserted between the nut 44 and the test race. With this construction, the plug 38 is removable so that the lower end of the shaft 30 may support a wide variety of shapes and sizes of test races. A knock-out hole 48 is provided in the shaft 30 to facilitate removal of the plug 38.

Intermediate the bearing plates 20 and 22, a cylindrical sleeve 50 is slidably mounted upon the shaft 30. Press fitted within the sleeve 50 is a bushing 52. This sleeve 50 has diametrically disposed V-shaped notches 54 in the upper end thereof which receive triangular projections 56 extending downwardly from arms 60 of a bifurcated lever 58. The projections 56 are knife edged and define a precise pivotal axis for the lever.

The right end of the lever 58, as viewed in FIGURE 1, supports an assembly of weights 62 placed on a hanger 63, having a hook 61 engaging the lever 58. These weights tend to pivot the lever 58 in a clockwise direction, however, such pivotal movement is opposed by a pair of levers 64 each provided with a foot 65 engaging one of the arms 60 of the lever 58. These levers 64 are pivotally mounted on a shaft 66 supported by a bracket 67, the latter being fixedly secured to the bearing plate 22. The construction is such that the weights 62 operating on the right end of the lever 58 induce a counterclockwise rotation of the levers 64.

Rotation of the levers 64 is opposed by pins 68 and 69 secured to a downwardly extending shaft 70. This shaft 70 is integral with a disc 72 which is rotatably supported by a bolt 74 threadedly engaging a disk-like element 76 mounted on the upper surface of the top 14 for the cabinet 10. A steel bellows 78 interconnects the discs 72 and 76 and functions to prevent the leakage of gases through the threaded joint between the bolt 74 and the disc-like member 76. The reason for this gas tight construction will appear more fully in the following.

The bolt 74 enables vertical adjustment of the pin 68 to the end that the lever 58 may be maintained substantially horizontal and an axial downward force will be transmitted to the sleeve 50.

The sleeve 50 at its lower end engages the inner race of an end thrust bearing 80 secured within a hollow frustum shaped wedge member 82. This member 82 is provided with diametrically disposed grooves 84 in the conical wall thereof forming a wedge which engages rollers 86 associated with a carriage assembly described in detail in the following.

Secured to the underside of the bearing plate 20 by means of bolts 92 is a cylindrical element 90 encircling the shaft 30. This element 90 slidably receives a pair of annular bearing races 94a and 94b which cooperate to form a split inner race for a thrust bearing assembly. The races 94a and 94b are locked in position by a nut 96 threadedly engaging the lower end of the element 90. A split outer race for the thrust bearing is formed by annular races 98a and 98b slidably mounted within a block designated by the reference numeral 100. The races 98a and 98b are locked by a nut 102. Positioned between the split inner and outer races are ball elements 104 caged by an annular member 106. This bearing assembly supports the block 100 for rotation about the rotational axis of the shaft 30. The split inner and outer races enable all play in the bearing to be taken up so that there will be no looseness or lateral play in the block 100. The importance of this construction will receive emphasis subsequently.

As may best be seen in FIGURE 2 the block 100 is substantially rectangular with inverse corners 105. Diametrically opposite sides 109 of this block are bored longitudinally to receive shafts 111. As best seen in FIGURE 4 there are two shafts 111 journalled in each side 109, the inner ends of the shafts being separated by a short gap. The size of the gap is determined initially by the location of annular flanges 108 integral with the shafts 111 which engage the end walls of the outwardly projecting sides 109.

The outer ends of the shafts 111 project into bushings 110 press fitted within sides 112 of a rectangular frame 113. The frame 113 also includes upper and lower cross bars 114 and 116, respectively. Thrust bearings 118 are interposed between the flanges 108 and the sides 112 of the frame. Play in the thrust bearings 118 is taken up by means of a set screw 124 threadedly engaging the block 100 and having a conical end 125 projecting between the shafts 111. By rotating the set screw 124 so as to wedge its conical end between the shafts 111, the thrust bearings 118 are placed under compression between the flanges 108 and the sides 112 of the rectangular frame.

As clearly shown in FIGURE 1 duplicate rectangular frames 113 supported as described hereinabove are provided on opposite sides of the block 100. The shafts 111 supporting these frames are interconnected by means of links 120 best shown in FIGURES 2 and 4 secured by snap fasteners 122 seated in grooves on the shafts 111. The upper cross bars 114 of the frames 113 support upwardly extending arms 126. These arms 126 engage the rollers 86 which ride in the grooves 84 of the frustum shaped wedge member 82.

The lower cross bars 116 of the frames 113 support brackets 130, there being two such brackets secured in spaced relation to the underside of each cross bar 116. The spaced brackets 130 support a pin 134 which provides a pivotal axis for a rub shoe holder 132. As best seen in FIGURE 3, the rub shoe holders 132 are each adapted to receive a rub shoe 138 secured by means of a set screw 136. The rub shoes 138 are supported at diametrically opposite positions with respect to the axis of rotation of the shaft 30 and the rub shoes illustrated have arcuate wear surfaces which conform to the contour of the test race 42.

By virtue of the described structure an axial force transmitted to the sleeve 50 by the lever 58 will deliver equal and opposite outward forces to the arms 126 associated with the pivotally mounted rectangular frames. This causes the lower ends of the rectangular frames to pivot inwardly forcing the rub shoes 138 against the periphery of the test race 42. Since the frustum shaped wedge member 82 and the pivotally mounted rectangular frames 113 are exactly symmetrical with respect to the axis of the shaft 30, the forces delivered to the rub shoes 138 are exactly equal and opposite and no forces tending to bend the shaft 30 are produced. Outward forces on the rectangular frame members 113 tend to bend the shafts 111 upon which they are pivotally mounted, however, this bending moment is resisted by the links 120 which interconnect the shafts 111 on opposite sides of the block 100.

With the exception of interference from the bearing plate 20, the block 100, the rectangular frames 113 supported thereby, and the frustum shaped wedge member 82 are free to rotate together about the axis of the shaft 30. Thus, when the shaft 30 is mechanically rotated, friction between the rub shoes 138 and the test race 42 will tend to rotate the entire carriage assembly for the rub shoes. Rotation of the carriage is opposed by an arm 150 connected to a strain gauge 152 and engaging the block 100. When the shaft 30 is mechanically rotated, the torque delivered to the carriage supporting the rub shoes 138 is indicated by the strain gauge 152.

It is important that the rotational movement of the carriage assembly does not alter the wear pattern of the rub shoes. It is for this reason that the bearing which supports the block 100 is provided with split inner and outer races which can be adjusted to take up play in the bearing.

The strain gauge 152 may be any of a number of well known types. Where the strain gauge produces an electrical signal, connection to the exterior of the cabinet 10 is made through terminals 164. A limit switch 153 mounted on the underside of the panel 20 and actuated by a screw 155 connected to the arm 150 shuts down the apparatus when the torque exceeds prescribed limits.

The assembly of weights 62 transmits a measurable force to the lever 58 and the force delivered to the rub shoes 138 is readily computed using well known trigonometric relations.

The area of contact between the rub shoes 138 and the test race 42 is also easily determined and the strain gauge 152 may be calibrated to indicate the rotational torque transmitted to the carriage which supports the rub shoes 138. With this information, it is a simple mathematical computation to determine the coefficient of sliding friction between the rub shoes and the test race.

While conforming rub shoes have been illustrated it is frequently desirable to use rub shoes which engage the test race in line contact initially and wear to a conforming shape. Changes in the rub shoes or in the test race will, of course, necessitate adjustment of the bolt 74 to maintain the lever 58 in the horizontal position.

FIGURE 5 shows a modification of the test race. In this modification a shaft 30a analogous to the shaft 30 of the preferred embodiment has at its lower end, a conical cavity 170. The apex of the cavity 170 is threaded as illustrated at 172. This cavity receives a generally conical test element 174, the apex of which is threaded at 176 for engagement with the threaded portion 172 of the shaft 30a. This test element has a cylindrical base portion 178 which has a cylindrical periphery serving as the test surface. Preferably, the handedness of the threads 176 is such that the torque to which the element 174 is subjected will tend to advance the element 174 into the cavity 170.

Advantages of this test race design are two-fold. First, the conical shape of the test element 174, which exactly matches the conical shape of the cavity 170, enables precise and reproducible positioning of the test element. Secondly, test elements 174 may be quickly and easily removed and interchanged.

One of the important advantages of the test apparatus herein disclosed is that the test race and the rub shoes which engage the test race are readily accessible for special treatment during a test run. Thus, FIGURE 1 shows a heating element 160 in phantom detail. The heating element is a hollow cylindrical unit which may be projected over the lower end of the shaft 30 so as to partially enclose the test race and the rub shoes. Through the use of such a heating element, friction tests may be made over a wide range of elevated temperatures. A pair of semicylindrical shields 166, each supported by one of the lower cross bars 116 of the rectangular frame member 113, cooperate to shield the bearings which support the shaft 30 from the heat supplied by the heating element 160. Preferably these shields are constructed from asbestos.

Even when a heating element is not used, a considerable amount of heat is generated in the test race 42 due to friction contact with the rub shoes 138. This heat is unavoidably conducted upwardly through the shaft 30 and to reduce the amount of heat that reaches the bearings, a plurality of annular radiating fins 168 are mounted on the shaft 30. To further reduce the heat in the bearings, a cooling liquid such as water may be circulated through the bearing plate 20 by conventional means, not shown.

It is frequently desired to vary the atmosphere in the test cabinet as well as the temperature in the vicinity of the test race. To this end the cabinet 10 is made air tight and electrical connections are made through the terminals 164. Special high current terminals, such as shown at 162, are provided for the heater 160 and like devices. With the cabinet fully closed, tests may be conducted in the presence of various gases and vapors under controlled conditions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An apparatus for testing the dynamic frictional properties of the surface of a cylindrical test element, said apparatus including a shaft, structure supporting the shaft in a vertical position for rotation, means for rotating the shaft about its longitudinal axis, means securing the cylindrical test element to the lower end of the shaft in coaxial relation therewith, a carriage assembly mounted for rotation about the axis of the shaft, means including a strain gauge opposing rotary movement of the carriage assembly, the carriage assembly including a pair of vertically extending frame members disposed diametrically with respect to the axis of rotation of the shaft and means supporting the frame members for pivotal movement each about a horizontal axis, a pair of rub shoes, means carried by the lower ends of said frame members supporting the rub shoes in diametrically disposed positions adjacent the surface of the test element, a wedge member mounted slidably on the shaft and projecting between the upper ends of the frame members, and means for driving the wedge member downwardly to force the upper ends of the frame members outwardly and the lower ends of the frame members inwardly of the shaft to thereby press the rub shoes against the surface of the test element.

2. In an apparatus for testing the dynamic frictional properties of a cylindrical member, said apparatus including a first shaft, structure supporting the first shaft for rotation, means for rotating the first shaft, and means securing said cylindrical member to the shaft in coaxial relation therewith, a pair of rub shoes, and a carriage assembly for supporting the rub shoes at diametrically disposed positions in pressured engagement with the surface of said cylindrical member, the carriage assembly including an apertured block through which the first shaft passes, bearing means supporting the block for rotation about the axis of the first shaft, a pair of frame members, second shaft means securing the frame members to opposite sides of the block for pivotal movement about parallel axes normal to and spaced from the axis of the first shaft, means at one end of each frame member supporting one of the rub shoes, a wedge member mounted slidably on the first shaft engaging the other ends of the frame members, and means for forcing the wedge member axially on the first shaft to force said other ends of the frame members outwardly from the first shaft thereby forcing the rub shoes inwardly into pressured relation with the cylindrical member.

3. The apparatus according to claim 2 wherein the frame members are hollow and rectangular and wherein the second shaft means securing the frame members to the block for pivotal movement comprises a plurality of second shafts, there being two of said second shafts for each frame member journalled in opposite sides thereof, said block having a boring traversing each of two opposite sides thereof, the boring in one side receiving in its opposite ends the second shafts journalled in the sides of one frame member, the boring in the opposite side receiving in its opposite ends the second shaft journalled in the sides of the other frame member, a thrust bearing mounted on each said second shaft between the block and the side of the frame member into which that shaft is journalled, each second shaft having a flange adjacent the thrust bearing thereon cooperating with the side of the frame member into which the shaft is journalled to contain the thrust bearing, the inner ends of the second shafts received by each said boring being disposed in close proximity within the boring, a pair of set screws penetrating the block, one set screw projecting into each boring between the shafts received thereby, the set screws each terminating in a conical wedge portion which, upon rotation of the set screw, forces the shafts in the boring penetrated thereby outwardly to compress the thrust bearings between the flanges on the second shafts and the sides of the frame members.

4. An apparatus for testing the dynamic frictional properties of a cylindrical body comprising a carriage assembly rotatably disposed about a driven shaft which supports the cylindrical body, said carriage assembly including a pair of elongate frame members disposed diametrically with respect to said shaft and pivoted intermediately about axes transverse to said shaft, each frame member supporting a rub shoe at one end thereof for engaging said cylindrical body, a wedge member mounted for sliding axial movement on said shaft between the ends of said frame members opposite said rub shoes, and means biasing said wedge member axially upon said shaft to spread the opposite ends of said frame members to thereby press the rub shoes against said cylindrical body, said means and said wedge member being rotatable, one relative to the other.

5. An apparatus for testing the dynamic frictional properties of a cylindrical body comprising a carriage assembly rotatably disposed about a driven shaft which supports said cylindrical body, said carriage assembly including a pair of elongate frame members disposed diametrically with respect to said shaft and pivoted intermediately about axes transverse to said shaft, a pair of rub shoe holders supported by each frame member, pivotal axis means securing one of said rub shoe holders to each said frame member on one side of its transverse pivotal axis, each said pivotal axis means establishing a pivotal axis for the rub shoe holder secured thereby which is transverse to said shaft and restraining pivotal movement of such rub shoe holder about any other axis, each rub shoe holder fixedly supporting a rub shoe for engagement with said cylindrical body, and means for spreading the ends of said frame members opposite said rub shoe holders to thereby bias said rub shoes against said cylindrical body.

References Cited in the file of this patent

UNITED STATES PATENTS

| | | |
|---|---|---|
| 2,110,288 | Cornell | Mar. 8, 1938 |
| 2,171,026 | Curtis | Aug. 29, 1939 |
| 2,539,578 | Headley | Jan. 30, 1951 |
| 2,635,927 | Leighton | Apr. 27, 1953 |
| 2,844,415 | Ryder | July 22, 1958 |